United States Patent [19]

Kirker et al.

[11] Patent Number: 4,812,222
[45] Date of Patent: Mar. 14, 1989

[54] PRODUCTION OF LUBRICASTING OILS BY HYDROCRACKING

[75] Inventors: Garry W. Kirker, Washington Township, Warren County; Philip Varghese, Voorhees, both of N.J.

[73] Assignee: Mobil Oil Corporation, New York, N.Y.

[21] Appl. No.: 218,436

[22] Filed: Jul. 11, 1988

Related U.S. Application Data

[63] Continuation of Ser. No. 28,813, Mar. 23, 1987, abandoned, which is a continuation-in-part of Ser. No. 879,787, Jun. 27, 1986, which is a continuation-in-part of Ser. No. 687,414, Dec. 28, 1984, abandoned.

[51] Int. Cl.$^4$ .............................................. C10G 65/12
[52] U.S. Cl. ........................................ 208/89; 208/18; 208/97; 208/110; 208/111; 208/112; 502/84
[58] Field of Search ................. 208/109, 111, 144, 89, 208/18, 97; 502/84

[56] References Cited

U.S. PATENT DOCUMENTS

| | | | |
|---|---|---|---|
| 3,405,055 | 10/1968 | Bittner | 208/111 |
| 3,804,741 | 4/1974 | Robson | 208/111 |
| 3,887,454 | 6/1975 | Hickson | 208/111 |
| 4,447,315 | 5/1984 | Lamb et al. | 208/111 |
| 4,481,102 | 11/1984 | Young et al. | 208/118 |
| 4,510,257 | 4/1985 | Lewis et al. | 502/63 |
| 4,548,705 | 10/1985 | Young et al. | 208/111 |
| 4,579,832 | 4/1986 | Shabtai et al. | 502/84 |
| 4,600,503 | 7/1986 | Angevine et al. | 208/251 H |
| 4,618,738 | 10/1986 | Young et al. | 208/111 |
| 4,632,815 | 12/1986 | Valyocsik | 208/111 |
| 4,637,991 | 1/1987 | Battiste et al. | 502/84 |
| 4,637,992 | 1/1987 | Lewis et al. | 502/84 |
| 4,640,764 | 2/1987 | Hamilton, Jr. | 208/144 |
| 4,650,779 | 3/1987 | Goldstein | 502/38 |
| 4,657,662 | 4/1987 | Valyocsik | 208/111 |

*Primary Examiner*—Anthony McFarlane
*Attorney, Agent, or Firm*—Alexander J. McKillop; Charles J. Speciale; Edward F. Kenehan, Jr.

[57] ABSTRACT

A proces for hydrocracking 343° C.+ feedstock which contains polycyclic aromatics to form a lube base stock having enhanced oxidation stability and viscosity index is disclosed. The process employs a catalyst which comprises a layered silicate, such as magadiite which contains interspathic polymeric silica and interspathic polymeric oxides of one or more elements selected from the group consisting of Al, B, Cr, Ga, In, Mo, Nb, Ni, Ti, Tl, W and Zr, preferably Al. The catalyst may also contain a hydrogenation component, e.g., palladium.

22 Claims, 2 Drawing Sheets

PRODUCTION OF LUBRICASTING OILS BY HYDROCRACKING

This is a continuation of copending application Ser. No. 028,813, filed on Mar. 23, 1987, now abandoned, which is a continuation in part of U.S. patent application Ser. No. 879,787, filed June 27, 1986, which is a continuation in part of U.S. patent application Ser. No. 687,414, filed Dec. 28, 1984, now abandoned, the contents of said applications being incorporated herein by reference.

This invention is directed to the production of high quality lubricating oils by hydrocracking high boiling hydrocarbons. More particularly, it relates to the production of mineral lubricating oils with uniquely desirable properties from specified essentially non-lube hydrocarbon charge stocks by hydrocracking.

It has, of course, long been recognized that one of the most valuable products of the refining of crude mineral oils is lubricating oil. Common practice is to recover lubricating oil components by extracting undesirable components, such as sulfur compounds, oxygenated compounds and aromatics, from a straight run distillate fraction with a selective solvent. However, with the gradual decline in the availability of paraffinic base crudes and a corresponding increase in the proportion of naphthenic and mixed naphthenic and asphaltic base crudes, it is becoming increasingly difficult to recover sufficient quantities of components suitable for lubricating oils by extraction.

One method which has been suggested as a remedy of this situation is hydrogenation of high boiling hydrocarbon charge stocks which do not contain a substantial quantity of lube oil components in order to produce such components. An example of this method is represented in U.S. Pat. No. 3,142,635, incorporated herein by reference, teaching the production of very high viscosity index oils in high yields of a unique kind by using a special catalyst. This method teaches the use of hydrocracking catalysts such as platinum on silica-alumina as well as others taught in U.S. Pat. No. 2,945,806, incorporated herein by referene. The use of such catalysts results in a product of high viscosity index. However, the prior art recognizes that substantial amounts of undesirable low viscosity index polycyclic aromatics which are oxidatively unstable will remain in the lube oil produced by hydrocracking unless removed by distillation. Another way of dealing with such impurities is taught in U.S. Pat. No. 3,530,061, incorporated herein by reference, which employs hydroprocessing the hydrocracked product with a hydrogenation-dehydrogenation catalyst comprising a support material of low cracking activity, e.g., platinum on alumina at temperatures and pressures which limit conversion to 600° F.− products. However, this procedure suffers from the drawback of requiring an additional hydroprocessing step. In U.S. Pat. No. 4,176,090, catalysts which comprise layered clays (smectites) intercalated with inorganic metal polymers, e.g., aluminum chlorhydrol, which form polymeric cationic hydroxy metal complexes are disclosed as suitable for conventional petroleum conversion processes such as catalytic cracking, hydrocracking, hydrotreating and isomerization. U.S. Pat. No. 4,579,832 discloses the use of layered smectite clays, e.g. montmorillonite, which are cross-linked with hydroxy-Al oligomers, as hydrocracking catalysts.

It has now been found that a hydrocracked lube oil product of high oxidation stability and viscosity index can be prepared in high yields by utilizing as hydrocracking catalyst a catalyst having hydrogenation-dehydrogenation activity which comprises a layered silicate containing both interspathic polymeric silica and an interspathic polymeric oxide of an element selected from the group consisting of B, Al, Ga, In and Tl, preferably interspathic polymeric alumina. In particular, the present invention relates to a process for producing a lubricating oil base stock from a hydrocarbon feedstock which comprises hydrocracking a hydrocarbon feedstock having a boiling point above about 343° C. (650° F.) and containing polycyclic aromatics. The catalyst employed herein possesses hydrogenation and cracking activity so that under hydrocracking conditions a hydrocrackate is produced which has a boiling point above about 343° C. (650° F.). The product is improved in that it contains a lesser proportion of polycyclic aromatic hydrocarbons than said charge stock which enhances the oxidation stability and viscosity index of the product.

The hydrocracking process can be carried out at temperatures ranging from about 300° to 450° C., preferably from about 325° to 400° C.; hydrogen pressures ranging from about 2 to 21 MPa, preferably from aout 3 to 21 MPa; liquid hourly space velocities ranging from about 0.1 to 10, preferably from about 0.2 to 3; H$_2$ circulations ranging from about 1000 to 10,000 scfb, preferably from about 2000 to 6000 scfb; and conversions to 650° F− product of less than about 70 percent volume of charge, preferably less than about 30 to 50 percent volume of change.

The hydrocarbon feed material suitable for use in the present invention can be substantially any hydrocarbon feed material comprising polycyclic aromatic hydrocarbon compounds, which compounds can be converted to other materials by treatment with hydrogen. Generally, it is preferred to use materials boiling above about 316° or 343° C. (600° F. or 650° F.). Such materials include heavy gas oils, residual stocks, cycle stocks, topped crudes, reduced crudes and relatively high boiling hydrocarbon fractions of cracking derived from coal, tars, pitches, asphalts and shale oils. These materials can be obtained by fractionation, as by vacuum distillation, of crude oils identified by their source, e.g., Pennsylvania, Mid-Continent, Gulf Coast, West Texas, Amal, Kuwait, Barco and Statfjord. Preferably, feed material obtained from resids should be made substantially free of asphaltenes prior to hydrocracking.

The hydrocarbon feedstock may be treated in order to reduce or substantially eliminate heteroatom content prior to the hydrocracking step. As necessary, the feedstock may be hydrotreated under mild or moderate hydroprocessing conditions to reduce sulfur, nitrogen, oxygen and metal content in the feedstock. Generally, a hydrocarbon feedstock used in hydrocracking should have a low metals content, e.g., less than about 200 ppm, in order to avoid obstruction of the catalyst and plugging of the catalyst bed. The mild to moderate hydrotreating conditions employed include pressures of 2 to 21 MPa and H$_2$ consumptions of 20 to 280 m$^3$/m$^3$. Conventional hydrotreating process conditions and catalysts may be employed, e.g., those set out in U.S. Pat. No. 4,283,272 to Garwood et al., incorporated herein by reference. A method for hydrotreating resids which contain naphthenes and which employs polymeric metal oxide intercalated layered oxides is set out in U.S. Pat. No. 4,600,503, incorporated herein by reference.

When hydrocracked, the high boiling hydrocarbon feed material employed in the present process undergoes conversion of some high molecular weight compounds to lower boiling materials, some of which are unsuitable for use as lube oils. More importantly, however, a fraction of the polycyclic aromatic and naphthenic compounds present in the feedstock is hydrogenated and cracked to form lower molecular weight naphthenes and paraffins. Because the polycyclics tend to degrade the viscosity index and stability of the stock, conversion of these materials is desirable, particularly in view of the tendency for paraffins thus made to be isomerized during hydrocracking. Ring opening of polycyclic compounds and isomerization of paraffins reduces the pour point of the hydrocracked products and improves the VI. Because these transformations are accomplished by the catalysts of this invention without excessive cracking to lower molecular weight non-lube products, high yields of low pour, high VI lubes result.

In those cases where a lower pour point lube is desired, the hydrocrackate can be dewaxed by any suitable means, such as solvent dewaxing and catalytic dewaxing. Catalytic dewaxing of lube stocks is described in U.S. Pat. No. Re. 28,398 to Chen et al as well as in U.S. Pat. Nos. 3,755,138, 4,176,050 and 4,283,272, all of which are incorporated herein by reference.

The catalyst employed in the hydrocracking process of the present invention is particularly suited to preparing lubes by hydrocracking high boiling hydrocarbon feeds which contain polycyclic aromatics or naphthenes. These catalysts by their inherent structure provide access of polycyclic materials to the dual functional metal-acid components present in the catalyst thereby facilitating conversion to more advantageous materials.

Many layered materials are known which have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electrostatic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

Laminated materials such as clays may be modified to increase their surface area. In particular, the distance between the interlamellar layers can be increased substantially by absorption of various swelling agents such as water, ethylene glycol, amines, ketones, etc., which enter the interlamellar space and push the layers apart. However, the interlamellar spaces of such layered materials tend to collapse when the molecules occupying the space are removed by, for example, exposing the clays to high temperatures. Accordingly, such layered materials having enhanced surface area are not suited for use in chemical processes involving even moderately severe conditions.

The extent of interlayer separation can be estimated by using standard techniques such as X-ray diffraction to determine the basal spacing, also known as "repeat distance" or "d-spacing". These values indicate the distance between, for example, the uppermost margin of one layer with the uppermost margin of its adjoining layer. If the layer thickness is known, the interlayer spacing can be determined by subtracting the layer thickness from the basal spacing.

The hydrocracking catalyst employed in the present invention comprises a layered silicate containing interspathic polymeric silica. The interlayer distance of the silicate is such that polycyclic hydrocarbon components of the feed can pass between adjacent layers of the silicate, preferably a distance greater than about 10 angstroms or even 15 angstroms, say about 15 to 20 angstroms. The catalyst possesses hydrogenation and cracking activity, the latter of which may be provided by the presence of an interspathic polymeric oxide comprising an element selected from the group consisting of Al, B, Cr, Ga, In, Mo, Nb, Ni, Ti, Tl, W and Zr, e.g., polymeric alumina. Hydrogenation activity can be provided by incorporating any suitable hydrogenation component into the catalyst, e.g., an element selected from the group consisting of Ru, Rh, Pd, Os, In and Pt, say, e.g., palladium. These noble metals are particularly suited to applications where feeds to the hydrocracking stage are low in sulfur. In those instances where raw untreated feeds are to be processed, it would be more appropriate to use base metal hydrogenating components, particularly combinations of metals from Groups VI A (Cr, Mo, and W) and VIII A (Fe, Co, Ni, Ru, Rh, Pd, Os, Ir, and Pt) of the Periodic Table.

The process of the present invention utilizes a hydrocracking catalyst which comprises a layered silicate which contains interspathic polymeric silica and interspathic polymeric oxide of an element selected from the group consisting of Al, B, Cr, Ga, In, Mo, Nb, Ni, Ti, Tl, W and Zr, e.g., polymeric silica-alumina between the layers of the silicate material. Preferably, such "pillared" materials are thermally stable, i.e., capable of withstanding calcining at a temperature of about 450° C. for at least 2 hours without significant reduction (e.g., not greater than 10 or 20%) in the spacing between the silicate layers. Preferably, such materials can withstand prolonged exposure to the conditions encountered during hydrocracking. Polymeric interspathic silicas displaced between silicate layers are considered to include oxides of two or more repeating units, preferably three or more repeating units, say four or more or even five or more repeating units. The extent of polymerization of the interspathic polymeric silica is believed to affect the ultimate interlayer separation of the layered product; that is to say, the greater the extent of polymerization occurring, the greater the interlayer distance resulting in the pillared layered silicate. A layered material suited for use in the present hydrocracking process, having a desired interlayer spacing can be prepared according to the method set out in U.S. patent application Ser. No. 897,787, filed June 27, 1986, incorporated herein by reference. In this method, the interlayer spacing of the layered material can be tailored by careful selection of the "propping" agent used to separate the layers during treatment with interspathic polymeric silica precursors which are eventually converted to the thermally stable polymeric silica "pillars." Indeed, a wide range of interlayer spacings can be achieved by this method. Interlayer distances can range anywhere from 2 to 30 angstroms or more, say, e.g., greater than 5, 10, 15 or 20 angstroms, depending largely on the type of "propping" agent used as well as the layered chalcogenide being treated. For the purpose of the present invention, interlayer distances which result in interlayer spacings large enough to accommodate polycyclic aromatics are desirable, e.g., interlayer spacings greater than 8 angstroms or preferably greater than 10 angstroms, say about 10 to 20 angstroms.

The pillared layered silicates employed herein can be prepared by treating a layered silicate which contains ion exchange sites having interspathic cations associated therewith, with an organic compound which is a cationic species or capable of forming a cationic species to effect exchange with the interspathic cations. An electrically neutral compound capable of conversion to the interspathic polymeric metal or non-metal oxide is provided between the layers of the treated layered silicate. The compound is then converted to the interspathic polymeric silica to form the layered material.

The pillared layered silicate employed in the present invention can be prepared by treating a layered silicate, e.g., a high silica alkali silicate such as synthetic magadiite, or synthetic kenyaite. These pillared layered silicate materials possess a framework composed essentially of only tetrahedral sheets, i.e. silicon is coordinated with four oxygen atoms, condensed on each other. These materials lack octahedral sheets, such as those found in clays, wherein an element such as aluminum is coordinated with six oxygen atoms. Besides interspathic polymeric silica, interspathic polymeric oxides of one or more elements selected from the group consisting of B, Al, Ga, In and Tl can also be incorporated between the layers of the silicate either separate from or incorporated into the interspathic polymeric silica pillars. Interspathic polymeric alumina is particularly useful in imparting acidic activity to the layered silicate. Interspathic polymeric oxides containing silica-alumina are a preferred pillar for these layered silicates.

Pillared silicates containing from about 5 to 50 wt% silica-alumina incorporated as the pillar material are desirable. Particularly preferred are silicates containing from about 10 to 20 wt% silica-alumina as the pillared material. The silica/alumina molar ratio ($SiO_2/Al_2O_3$) of the pillared material may vary between about 5 to 1000 or even greater.

Layered silicate materials of relatively high interplanar distance (d-spacing), e.g., greater than about 10, 15, 18, 20, 25, or even 30 or more angstroms, can be prepared using the above-discussed techniques. These materials are capable of being exposed to severe conditions such as those encountered in calcining, e.g., at temperatures of about 450° C. for about two or more hours, e.g., four hours, in nitrogen or air, without significant decrease, say, e.g., less than about 10%, in interlayer distance. The size of interspathic polymeric silica contained within the final product can be greatly varied because the polymeric silica precursor species are introduced in an electrically neutral form such that the amount of interspathic material incorporated within the layered silicate is not dependent upon the charge density of the original layered silicate starting material.

Charge density should be taken into consideration in determining the suitability of the cationic species introduced between the layers in the procedure used to prop open the layers prior to pillaring. The use of an electrically neutral polymeric oxide precursor allows the formation of materials in which the interlayer spacing can be widely varied.

The layered silicate starting material can contain ion exchange sites having interspathic cations associated therewith. Such interspathic cations may include hydrogen ion, hydronium ion or alkali metal cation. The starting material is treated with a "propping" agent comprising a source of organic cation, which source may include the cation itself, in order to effect an exchange of the interspathic cations resulting in the layers of the starting material being propped apart. In particular, alkylammonium cations have been found useful. Thus $C_3$ and larger alkylammonium cations, e.g., n-octylammonium, can be readily incorporated within the interlayer species of the layered silicates, serving to prop open the layers in such a way as to allow incorporation of the polymeric chalcogenide precursor. The extent of the interlayer spacing can be controlled by the size of the organoammonium ion employed so that use of the n-propylammonium cation can achieve a d-spacing of about 2 to 5 A or an opening of about 2–3 A, whereas to achieve an interlayer opening of 10 to 20 A, an n-octylammonium cation or a cation of equivalent length is required. The organic ammonium cations separating the silicate layers may also be formed in situ by reaction of the neutral amine species with interlayer hydrogen or hydronium cations of the layered silicate starting material.

The polymeric oxide pillars are formed from a precursor material which is preferably introduced between the layers of the organic "propped" species as a cationic, or more preferably, electrically neutral, hydrolyzable compound of the desired elements. The precursor material is preferably an organic compound containing said desired elements which is a liquid under ambient conditions. In particular, hydrolyzable compounds, e.g., alkoxides, of the desired elements of the pillars are utilized as the precursors. Suitable polymeric silica precursor materials include tetraalkylsilicates, e.g., tetrapropylorthosilicate, tetramethylorthosilicate and, most preferably, tetraethylorthosilicate. Introduction of interspathic polymeric oxide of an element selected from the group consisting of Al, B, Cr, Ga, In, Mo, Nb, Ni, Ti, Tl, W, and Zr to the pillar system can be achieved by contacting a hydrolyzable compound of the desired element with the organic "propped" species before, after or simultaneously with the contacting of the layered chalcogenide with the silicon compound. Preferably, the hydrolyzable aluminum compound employed is an aluminum alkoxide, e.g., aluminum isopropoxide.

After hydrolysis to produce the polymeric oxide pillars and calcination to remove the organic propping agent, the final pillared product may contain residual exchangeable cations. Such residual cations in the layered material can be ion exchanged by known methods with other cationic species to provide or alter the catalytic activity of the pillared product. In particular, hydrogenation components containing at least one element selected from the group consisting of Ru, Rh, Pd, Os, Ir and Pt, preferably Pd, can be introduced by ion-exchange or impregnation techniques known in the art. Representative ion exchange techniques are disclosed in a wide variety of patents including U.S. Pat. Nos.

3,140,249; 3,140,251; and 3,140,253, all of which are incorporated herein by reference. Generally, the hydrocracking catalyst of the present invention can contain about 0.1 to 20 weight percent, preferably about 0.5 to 15 weight percent hydrogenation component.

The polymeric oxide precursor-containing product can be exposed to suitable conversion conditions, such as hydrolysis and/or calcination to form the layered material employed in the present invention. The hydrolysis step may be carried out by any method, for example, by interspathic water already present in the organic-"propped" layered silicate material. Because of the effect of interspathic water on hydrolysis, the extent of hydrolysis may be modified by varying the extent to which the organic-"propped" species is dried prior to addition of the polymeric oxide precursor. As noted earlier, the product after conversion to the polymeric oxide form may be exposed to conditions which remove organic compounds such as the organic cation propping agents, e.g., exposure to elevated temperatures such as those encountered by calcining in air or nitrogen. Such products, especially when calcined, exhibit high surface area, e.g., greater than 200, 300, 400 or even 600 m$^2$/g, and thermal and hydrothermal stability.

The pillared silicates can be composited with porous inorganic oxide matrix materials such as silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of pillared silicate component and inorganic matrix, on an anhydrous basis, may vary widely with the silicate content ranging from about 1 to 99 percent by weight and more usually in the range of from about 5 to about 80 percent by weight of the dry composite.

Layered silicates, e.g., high silica alkali silicates such as magadiite, natrosilite, kenyaite, makatite, nekoite, kanemite, okenite, dehayelite, macdonaldite and rhodesite, unlike swellable clays, lack octahedral sheets, i.e., sheets composed of atoms which are octahedrally coordinated with oxygen atoms. Such high silica alkali silicates, as well as their synthetic analogues are well-suited as starting materials used in preparing the pillared layered silicates employed in the process of the present invention. Without stable intercalated pillars, these starting materials tend to undergo collapse of their layers at elevated temperatures, which results in low porosity and low surface area.

The layered silicate starting materials known as high silica alkali silicates, whose layers lack octahedral sheets, can be prepared hydrothermally from an aqueous reaction mixture containing silica and caustic at relatively moderate temperatures and pressures. These layered silicates may contain tetracoordinate framework atoms other than Si. Such layered silicates can be prepared by co-crystallizing in the presence of non-silicon tetravalent elements, e.g., those selected from the group consisting of B, Al, Ga, In and Tl as well as any other such elements which are catalytically useful when incorporated in the silicate structure. Alternatively, non-silicon framework elements already in a layered silicate may be substituted by a tetracoordinate element. Both co-crystallized and substituted layered high silica alkali silicates may be treated by the procedure described above to provide layered materials containing interspathic polymeric oxide pillars.

Synthetic magadiite-type materials which contain interspathic polymeric oxides are particularly suited to use in the hydrocracking process of the present invention. Synthetic magadiite is readily synthesized hydrothermally from a reaction mixture containing inexpensive sources of silica and caustic. Tetracoordinate elements other than silicon, e.g., those selected from the group consisting of B, Al, Ga, In, Tl and other catalytically useful metals, may be added to the reaction mixture to produce synthetic magadiite-type layered silicates. Preferably, such elements are selected from the group consisting of Al and Ga. An organic directing agent may also be added to the reaction mixture. The reaction mixture for synthetic layered silicate-type materials can be described in molar ratios as follows:

| | |
|---|---|
| $SiO_2/X_2O_3 =$ | 10 to infinity where X can be B, Al, B, Ga, In and/or Tl or other catalytically useful metal |
| $M^+OH^-/SiO_2 =$ | 0 to 0.6, (preferably 0.1–0.6) M = an alkali metal |
| $H_2O/SiO_2 =$ | 8–500 |
| $R/SiO_2 =$ | 0–0.4 | where R can be an organic such as benzyltriethylammonium chloride, benzyltrimethylammonium chloride, dibenzyldimethylammonium chloride, N,N'-dimethylpiperazine, triethylamine, or other quaternary compounds or heterocyclic amines.

The reaction mixture can be maintained at a temperature of about 100° to 200° C. for anywhere from about 1 to 150 days in order to form a product having the following composition:

| | |
|---|---|
| % N = | 0 to 3, e.g., 0 to 0.3 |
| $SiO_2/X_2O_3 =$ | 10 to infinity where X may be in the tetrahedral or octahedral position |
| $M_2O/SiO_2 =$ | 0 to 0.5, e.g., 0.05–0.1 |

The synthetic layered silicate materials thus prepared have a low surface area. Introduction of interspathic polymeric oxides according to the above-described procedure can increase the surface area of these materials. Generally, the synthetic magadiite-type (or layered silicate-type) material is acidified by any suitable means, e.g., treatment with aqueous 0.1N HCl, and thereafter treated with a "propping" agent. A suitable compound capable of conversion to a polymeric oxide is combined with the "propped" layered silicate and the resulting material can then be calcined to remove residual organics.

Figure 1:
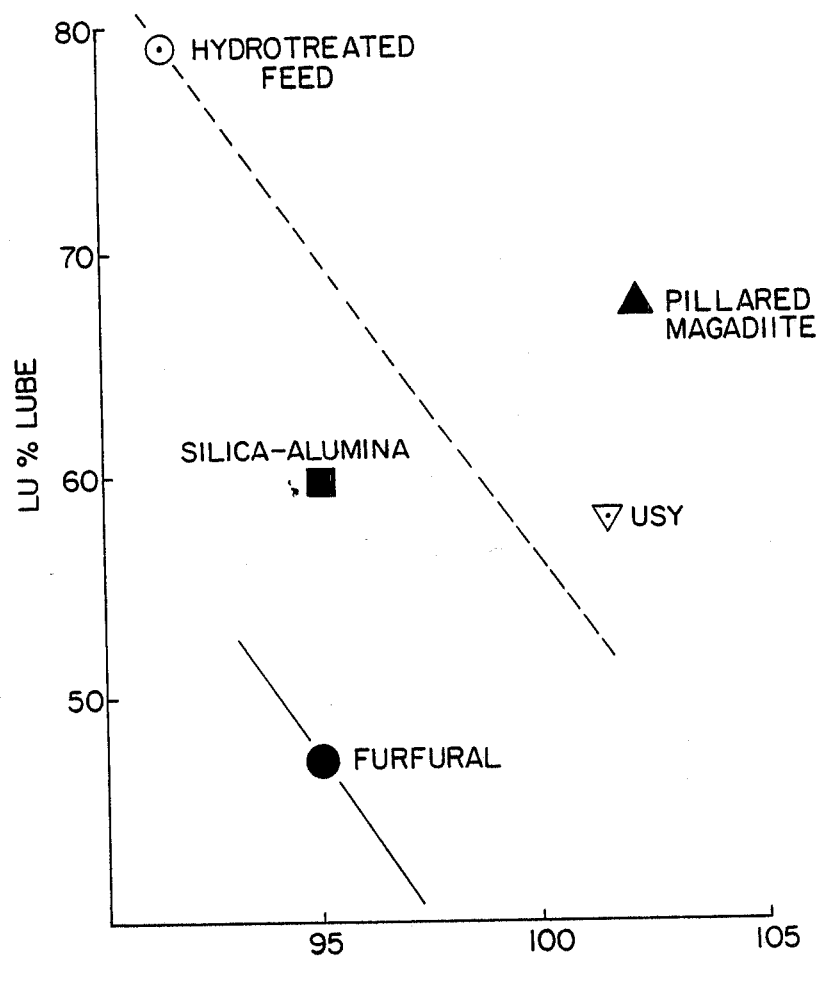
FIG. 1 depicts a comparison of 650° F.+ yield loss over viscosity index improvement between pillared magadiite, amorphous silica-alumina and large pore zeolite hydrocracking catalysts, using a residual feed.

The following examples illustrate the process of this invention and are not included to limit the scope thereof.

EXAMPLE 1

Preparation of Synthetic Magadiite Containing Interspathic Polymeric Silicon Oxides and Aluminum Oxides (a) A gel was produced by mixing 400 g of a fumed silica (Cabosil®) in 54.4 g of 98% NaOH and 1.4 kg water. The gel was crystallized in a 2 liter polypropylene jar at 100° C. for 23 days to produce synthetic magadiite, which was then filtered, washed with hot water and dried at 121° C. (250° F.) overnight. The dried product had the following composition (wt%):

| | |
|---|---|
| $SiO_2$ | 85.0 |
| $Na_2O$ | 6.4 |
| $Al_2O_3$ | 0.007 |

150 g of the dried high silica synthetic magadiite product were acid exchanged with a solution of 0.5N HCl at a pH of 2.0 for 24 hours, filtered, washed chloride-free and air dried. The dried sample was treated with an aqueous n-octylamine solution made up of 160 g (1.24 mol) of n-octylamine in 3,500 g (194.4 mol) of distilled water, for 24 hours at room temperature, filtered, washed and oven dried at 77° C. (170° F.) in vacuo. A solution of 19 g of aluminum isopropoxide (0.093 mol) in 747 g of tetraethylorthosilicate (3.6 mol) was heated in a steam chest overnight. Thereafter, 120 g (61.45% solids) of the octylammonium form of the magadiite were added to the solution and the resulting mixture was held in a sealed vessel for 24 hours at ambient temperature. The mixture was then filtered, air dried and calcined in flowing nitrogen for one hour followed by flowing air for two hours, at 538° C. The resulting product was a synthetic magadiite pillared with a polymeric oxide of silicon and a polymeric oxide of aluminum. The chemical analyses and physical properties for the calcined silica-alumina pillared magadiite are summarized below in Table 1.

TABLE 1

| Elemental Analyses | |
|---|---|
| $SiO_2$, wt % | 87.7 |
| $Al_2O_3$ | 2.7 |
| C | 0.027 |
| Ash @ 1000° C. | 94.9 |
| Physical Properties Surface area | 504 m²/g |
| Sorptions, g/100 g | |
| $H_2O$ | 19.1 |
| $C_yC_6$ | 15.1 |
| $n-C_6$ | 13.7 |
| Basal spacing (XRD) | 27° A (~16° A interlayer opening) |
| Alpha (538° C.) | 7 |

The silica-alumina pillared magadiite was rotary impregnated to incipient wetness with a 0.1M aqueous solution of $Pd(NH_3)_4Cl_2$ under partial vaccum. The resulting material was rolled under a $CO_2$ atmosphere for one hour, dried at room temperature for four hours and then dried at 121° C. The dried catalyst was calcined for 3 hours at 349° C. in static air. The calcined catalyst was determined to contain 0.42 wt% Pd.

EXAMPLE 2

Hydrocracking Using Silica-Alumina

Two raw petroleum streams having the characteristics set out in Table 2 below were hydroprocessed over a Ni-Mo/alumina hydrotreating catalyst at conditions shown.

TABLE 2

| | Statfjord Deasphalted Resid SDAR | Arab Light Raw Hvy. Distillate ALR HD |
|---|---|---|
| % H | 12.96 | 12.29 |
| % S | 0.76 | 2.78 |
| ppm N | 1200 | 1000 |
| API Gravity | 27 | 20.3 |
| Pour Point, °F. | 120 | 110 |
| HDT Conditions | Hydrotreated over Ni—Mo/alumina at 2000 psig, 740° F. | |
| LHSV | 0.5 | 0.3 |
| Product Analyses | HDT SDAR | HDT ALR HD |
| % H | 14.1 | 13.69 |
| % S | 0.01 | 0.01 |
| ppm N | 12 | 12 |
| Pour Point, °F. | 120 | 110 |

One of the hydrotreated streams was hydrocracked in the presence of a commercial silica-alumina catalyst at a hydrogen pressure of about 1900 psig, a space velocity of about 2.

Additional conversion conditions along with properties of the total liquid product and 650° F.+ (lube range) product are given in Table 3 below.

TABLE 3

| Hydrocracking Using Amorphous Silica-Alumina | |
|---|---|
| | HDT ST DAR |
| Feed | |
| Temp, °F. | 680 |
| Pressure, psig | 1900 |
| LHSV | 2 |
| TLP PROPERTIES | |
| 650° F.+ Conversion, wt % | 25 |
| Pour Point, ° F. | 70 |
| 650° F.+ Properties | |
| Pour Point, °F. | 110 |
| % H | 13.97 |
| Silica Gel Aromatics | 15.5 |

EXAMPLE 3

Hydrocracking Using Ultrastable Y Zeolite USY

The procedure of Example 2 was followed except that the hydrocracking catalyst employed was an alumina bound, large pore ultrastable Y zeolite containing palladium.

The USY catalyst used was prepared using procedures well known to those skilled in the art. The palladium was impregnated as described for the pillared magadiite. The USY catalyst was characterized as follows:

| | |
|---|---|
| surface area, m²/g | 407 |
| Na, wt % | 0.066 |
| Pd, wt % | 0.66 |

Both of the hydrotreated feeds shown in Table 2 were hydrocracked at conditions shown in Table 4. The results in terms of conversions and lube range properties are shown in Table 4.

TABLE 4

| | Hydrocracking With USY | |
|---|---|---|
| | HDT ST DAR | HDR ALAR HD |
| Feed | | |
| Temp, °F. | 610 | 620 |
| Pressure, psig | 1900 | 1900 |
| LHSV | 1.8 | 1.8 |
| TLP PROPERTIES | | |
| 650° F.+ Conversion, wt % | 45 | 55 |
| Pour Point, °F. | 80 | 70 |
| 650° F.+ Properties | | |
| Pour Point, °F. | 120 | 110 |
| % H | 13.96 | 14.31 |
| Silica Gel Aromatics | 9.9 | 15.2 |

EXAMPLE 4

Hydrocracking Using Silica-Alumina Pillared Magidiite

The procedure of Example 2 was followed except that the Pd-containing pillared magadiite catalyst of Example 1 was used. Table 5 below shows hydrocracking results obtained at two different operating conditions for the hydrotreated Statfjord deasphalted resid, (HDT SAR) and one condition for the hydrotreated Arab Light heavy distillate (HDT A LRHD).

TABLE 5

| | Hydrocracking With Silica-Alumina Pillared Magadiite | | |
|---|---|---|---|
| | HDT SDAR | | HDT ALRHD |
| Feed | | | |
| Temp, °F. | 700° F. | 750° F. | 700° F. |
| Pressure, psig | 1900 | 600 | 1900 |
| LHSV | 2 | 2 | 2 |
| TLP PROPERTIES | | | |
| 650° F.+ Conversion, wt % | 30 | 30 | 64 |
| Pour Point, °F. | 45 | 45 | −5 |
| Cloud | — | — | 2 |
| 650° F.+ Properties | | | |
| Pour Point, °F. | 85 | 65 | 90 |
| KV @ 40° C. | | | 34.97 |
| % H | 14.40 | 14.1 | 14.51 |
| % $C_A$ | 11 | 9 | <5 |
| Silica Gel Aromatics | 5.4 | 19.6 | 4.2 |

Comparing results on the HDT SDAR, the pillared magadiite produces a less aromatic 650° F.+ lube range product than either the amorphous silica-alumina or large pore zeolite (USY). The pillared magadiite also preserves more of the product in the lube boiling range (650° F.+) than the USY zeolite and almost as much as the amorphous silica-alumina.

Table 5 also shows that products derived from the synthetic magadiite had lower pour points in both the 650° F.+ and full range products than those from other hydrocracking catalysts. Since further dewaxing to low pour (20° F+) is necessary in each of these cases, yields of finished lube are higher in those cases where a synthetic magadiite hydrocracking catalyst was used. Similar results are shown in Table 5 for the HDT ALRHD.

After catalytic dewaxing to 10° F. pour of all product, the yield loss versus viscosity index improvement for feeds derived from hydrotreated Statfjord deasphalted resid over various hydrocracking products was plotted in FIG. 1, along with a hydrotreated feed which was not subjected to hydrocracking and a feed which was solvent extracted with furfural. All of the products were dewaxed to a pour point of −12° C. (10° F.) with ZSM-5 before measuring yield and viscosity index. The 343° C. (650° F.+) yield of the hydrotreated feed was about 79% by volume. Viscosity index was about 92. The product of Example 4, hydrocracked with the pillared magadiite of the presently claimed process, was obtained in a 343° C.+ yield of about 68% by volume. Viscosity index was about 102. In comparison, the product of Example 2, hydrocracked with a silica-alumina catalyst, was obtained in a 343° C.+ yield of about 60% by volume at a viscosity index of only 95. The product of Example 3 using USY was obtained at a 343° C.+ yield of only about 58%, although viscosity index was about 102. Finally, furfural solvent dewaxed product was obtained in a 343° C.+ yield of about 47% at a viscosity index of 95. FIG. 1 shows that the pillared magadiite hydrocracking catalyst provides a lube product of increased viscosity index at enhanced yields over conventional amorphous hydrocracking catalysts as well as large pore zeolites.

Figure 2:
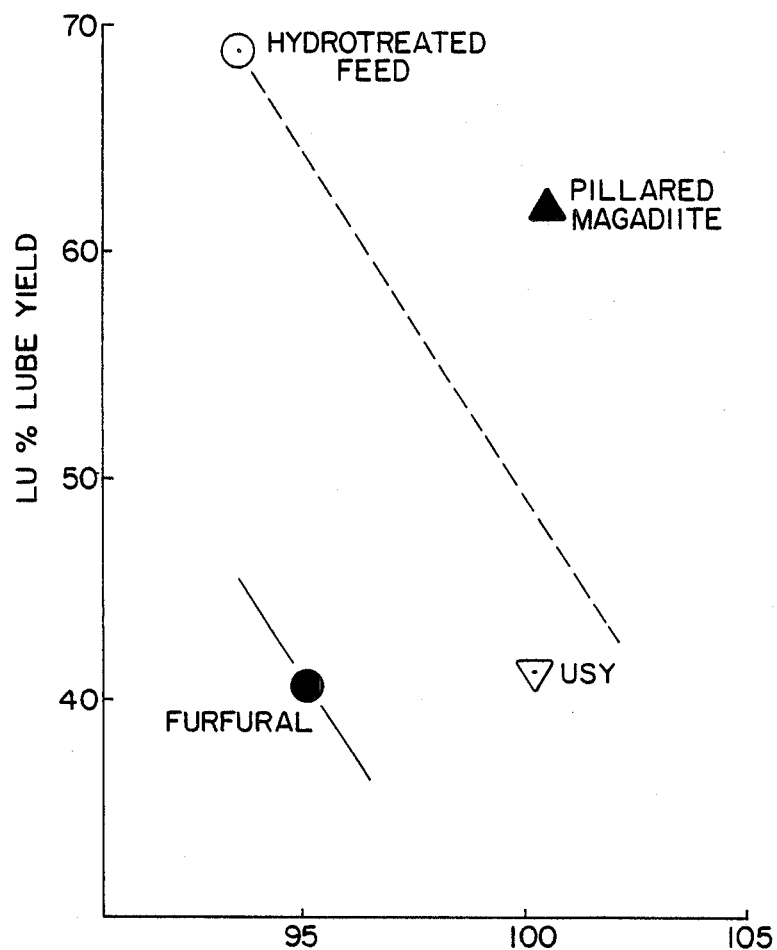
FIG. 2 depicts a comparison of 650° F.+ yield loss over viscosity index improvement between pillared magadiite, amorphous silica-alumina and large pore zeolite hydrocracking catalysts, using a distillate derived feed.

FIG. 2 is similar to FIG. 1 except that instead of the residual feed, the distillate derived feed hydrotreated Arab Light Heavy Distillate is employed. The results are similar in that the pillared magadiite catalyst produces lube hydrocrackate in higher yield and at enhanced viscosity index than techniques which employ conventional catalysts.

The more open structure of the pillared layered magadiite is apparent from the boiling range of the lubes produced by pillared silicate as opposed to large pore USY zeolite, as shown in Table 6 below.

TABLE 6

| CHARACTERISTICS OF PRODUCTS FROM EXAMPLES 3 & 4 STATFJORD DAO FEED | | |
|---|---|---|
| | Pd-USY | Pd-Pillared Magadiite |
| Hydrocracking Catalyst | | |
| Lube Yield, % | 58 | 68 |
| Viscosity, SUS | 820 | 640 |
| Boiling Range | | |
| 10% | 750 | 720 |
| 20% | 875 | 807 |
| 50% | 1034 | 992 |
| 1130° F.+ | 21 | 12 |

Considerable reductions in the 610° C.+ (1130° F.+) fraction of lubes are evident from the treatment with pillared silicate which indicates that large molecules are more readily converted in the layered silicate.

What is claimed is:

1. A process for producing a lubricating oil base stock from a hydrocarbon feedstock which comprises:
   hydrocracking a hydrocarbon feedstock having a boiling point above about 343° C. (650° F.) and containing polycyclic aromatic hydrocarbons in the presence of a catalyst having cracking and hydrogenation activity and comprising a layered silicate having a framework composed essentially of only tetrahedral sheets, containing interspathic polymeric silica and interspathic polymeric oxide of an element selected from the group consisting of Al, B, Cr, Ga, In, Mo, No, Ni, Ti, Tl, W and Zr, in order to produce a hydrocrackate having a boiling point above about 343° C. (650° F.) which contains a lesser proportion of polycyclics than said charge stock.

2. The process of claim 1 wherein said hydrocracking occurs at temperatures ranging from about 300° to 450° C., hydrogen pressures ranging from about 2 to 21 MPa, liquid hourly space velocities ranging from about 0.1 to 10, H$_2$ circulations ranging from about 1000 to 10,000 scfb (standard cubic feet per barrel), and conversions to 650° F.− product of less than about 70 percent volume of charge.

3. The process of claim 1 wherein said hydrocracking ocurs at temperatures ranging from about 325° C. to 420° C., hydrogen pressures ranging from about 2 to 21 MPa, liquid hourly space velocities ranging from about 0.2 to 3, H$_2$ circulations ranging from about 2000 to 6000 scfb (standard cubic feet per barrel), and conversions to 650° F.− product of less than about 50 percent volume of charge.

4. The process of claim 1 wherein said hydrocarbon feedstock is hydrotreated prior to said hydrocracking.

5. The process of claim 1 wherein said hydrocrackate contains wax and is dewaxed to a pour point of less than about −4° C. (25° F.).

6. The process of claim 4 wherein said hydrocrackate contains wax and is dewaxed to a pour point of less than about −4° C. (25° F.).

7. The process of claim 1 wherein said hydrocarbon feedstock contains at least about 20 volume percent of a fraction boiling above about 610° C. (1130° F.) and said hydrocrackate contains less than about 15 volume percent of a fraction boiling above about 610° C. (1130° F.).

8. The process of claim 1 wherein said layered silicate comprising interspathic polymeric silica has an interlayer distance greater than about 10 angstroms.

9. The process of claim 8 wherein said interlayer distance is greater than about 15 angstroms.

10. The process of claim 8 wherein said layered silicate contains an interspathic polymeric oxide of aluminum.

11. The process of claim 8 wherein said catalyst contains about 0.1 to 20 weight percent of at least one element selected from the group consisting of Ru, Rh, Pd, Os, Ir and Pt.

12. The process of claim 10 wherein said catalyst contains about 0.3 to 5 weight percent of palladium.

13. The process of claim 1 wherein said layered silicate is selected from the group consisting of magadiite, natrosilite, kenyaite, makatite, nekoite, kanemite, okenite, dehayelite, macdonaldite and rhodesite.

14. The process of claim 1 wherein said layered silicate is magadiite.

15. The process of claim 10 wherein said layered silicate is magadiite.

16. The process of claim 12 wherein said interlayer distance is greater than about 15 angstroms.

17. The process of claim 16 wherein said hydrocarbon feedstock is hydrotreated prior to said hydrocracking, said hydrocrackate is subsequently dewaxed to a pour point of less than about 25° F. and said dewaxate has a viscosity index greater than said hydrocarbon feedstock.

18. The process of claim 17 wherein said hydrocracking occurs at a temperature of about 300° to 450° C., a pressure of about 2 to 21 MPa, a space velocity of about 0.1 to 10 LHSV and a hydrogen circulation rate of about 1000 to 10,000 scfb (standard cubic feet per barrel) of H$_2$.

19. The process of claim 18 wherein said layered silicate is magadiite and said catalyst contains at least one element selected from the group consisting of Ru, Rh, Pd, Os, Ir and Pt.

20. The process of claim 1 wherein said element is selected from the group consisting of Al, B, Ga, In, and Tl.

21. A process for producing a lubricating oil base stock from a hydrocarbon feedstock which comprises: hydrocracking a hydrocarbon feedstock having a boiling point above about 343° C. (650° F.) and containing polycyclic hydrocarbons in the presence of a catalyst having cracking and hydrogenation activity and comprising a layered silicate having a framework composed essentially of only tetrahedral sheets, containing interspathic polymeric silica-alumina, which catalyst has hydrogenation and cracking activity, in order to produce a hydrocrackate having a boiling point above about 343° C. (650° F.) which contains a lesser proportion of polycyclic hydrocarbons than said charge stock.

22. The process of claim 21 wherein said catalyst contains palladium.

* * * * *

UNITED STATES PATENT AND TRADEMARK OFFICE
CERTIFICATE OF CORRECTION

PATENT NO. : 4,812,222

DATED : March 14, 1989

INVENTOR(S) : G. W. Kirker et al.

It is certified that error appears in the above-identified patent and that said Letters Patent is hereby corrected as shown below:

Title             "Lubricasting should be --Lubricating--
Col. 2, Line 26    "aout" should be --about--
Col. 11, Line 56   "(20°F+)" should be --(20°F-)--

Signed and Sealed this

Fifth Day of December, 1989

Attest:

JEFFREY M. SAMUELS

*Attesting Officer*     *Acting Commissioner of Patents and Trademarks*